Patented Nov. 29, 1938

2,138,357

UNITED STATES PATENT OFFICE 2,138,357

DIALYSIS OF AQUEOUS CAUSTIC SOLUTIONS

Arthur W. Saddington and Arlie P. Julien, Syracuse, N. Y., assignors to The Solvay Process Company, New York, N. Y., a corporation of New York No Drawing. Application April 24, 1936, Serial No. 76,250

10 Claims. (Cl. 23—184)

This invention relates to dialysis. It is particularly directed to improvements in the dialysis of materials which liberate heat upon dilution, such as concentrated caustic liquors.

Although dialysis presents an effective method for the purification of aqueous caustic solutions, such as sodium or potassium hydroxide, and the method has been applied to solutions of low concentration, its application to the purification of concentrated solutions appears never to have been commercially developed. If the process of purification by dialysis as carried out in the treatment of dilute caustic solutions is applied to concentrated solutions, it has been found that the diaphragm life for ordinary parchment (parchmentized paper) diaphragms is exceedingly limited. The stronger diaphragms or diaphragm materials available, while possessing longer life, are much more costly and furthermore do not yield as satisfactory purification as the thinner parchment diaphragms. It is probable that these disadvantages are responsible for the failure of the alkali industry to take advantage of this purification method.

It has now been found that a primary contributing cause for the early failure of parchment diaphragms in the dialysis of concentrated caustic solutions results from prevalence of an excessive local temperature at one or more points along the diaphragm and that local overheating of the diaphragm may be avoided by the provision of cooling means to lower the temperature of the solution contacting with the diaphragm. The maximum temperature permitted in the dialyzer for any substantial length of time is preferably maintained below about 30° C. in the case of parchmentized cellulose diaphragms, by suitable regulation of the cooling effect.

While in the past it has been recognized that concentrated caustic solutions, upon dilution, liberate considerable heat, the calculated heat liberation in the purification of concentrated caustic solutions is not sufficient to seriously affect the diaphragm. Thus, in the case of dialysis of a 50% sodium hydroxide solution into water to yield a 25% to 30% concentration of sodium hydroxide in the waste liquid and in the purified product, it has been calculated that sufficient heat is liberated to raise the liquid temperature to around 45° C. starting with caustic at about 30° C. and water at about 22° C. Nevertheless, upon actual test it was found that within the dialyzer temperatures as high as 110° C. were attained. However, the solution left the dialyzer at a temperature approximately that calculated, namely around 35° to 45° C.

The excessive temperature prevailing locally at certain points along the diaphragm apparently is the result of the recuperative effect attained by the countercurrent flow of ingoing water and caustic solution. It must be remembered, of course, that in normal practice these solutions are introduced into the apparatus cold and hence no heat is supplied to the system for causing excessive heating as a result of the initial temperatures of the liquids. The heat of dilution of sodium hydroxide solution having a concentration around 11% is substantially nil while dilution below this concentration actually absorbs heat. Above about 11% concentration the heat of dilution is positive and increases gradually with concentration so that upon dilution of 50% caustic solution down to 25% caustic there is a very substantial liberation of heat. This heat begins to be liberated as soon as the concentrated solution enters the apparatus and dialysis takes place. At the point where the waste liquor leaves apparatus of the countercurrent type at an elevated temperature, say 10° C. above that at which it entered the apparatus, the waste solution is in heat exchange relation with water or aqueous solution entering the apparatus and thereby raises the temperature of this liquid. As a consequence the temperature of the dialytic membrane is not merely that which would be obtained by straight dilution but is the sum of the heat so obtained plus the sensible heat realized as a result of recuperation. The entering caustic of course undergoes an effect similar to that of the entering water and is heated by heat exchange with the pure caustic solution leaving the dialyzer. Conversely the products leaving the apparatus are cooled from their excessive temperatures by heat exchange with the cooler entering liquid so that the high local temperatures prevailing within the dialyzer are not detectable by observation of the liquors leaving the apparatus.

Although the excessive temperatures prevailing within the apparatus might be avoided if the recuperative effect mentioned were avoided, as by provision of concurrent rather than countercurrent flow of liquids along the dialytic membrane, this type of flow yields a so-called pure product of relatively low caustic concentration and relatively impure as compared with a product obtained by countercurrent flow. Accordingly the use of concurrent flow is objectionable where a product of maxiumum concentration and purity is desired.

By cooling the liquids employed to an initially low temperature, the maximum temperature attained in the dialyzing apparatus may be reduced. However, these cold liquids are subject to the same heating conditions that formerly caused excessive temperatures in the apparatus and their temperature rise will be correspondingly great. Thus, where water and caustic enter at 22° and 30° yielding a hot spot having a temperature as high as 110°, cooling of the water and caustic entering the apparatus to a temperature initially 20° lower, say 2° C. and 10° C. respectively, would yield a maximum temperature only approximately 20° below 110°, or 90° C., a temperature still sufficiently high to be exceedingly detrimental to the parchment membrane. Lower initial temperatures have the further objection that a higher viscosity is exhibited by the caustic solutions and flow through the apparatus is thus impaired.

The preferable capacity and location of cooling devices to provide an intermediate cooling effect—that is, cooling between the loci of first dialytic contact of the liquids—in the dialysis of caustic solutions will, of course, depend upon the type of apparatus employed and the concentration of the caustic solution to be dialyzed. Thus, in the treatment of impure caustic solutions of relatively low concentration, for example sodium hydroxide solutions below 25% concentration, the temperatures normally attained are insufficient to cause serious consequences. For concentrations above this, the degree of auxiliary cooling will depend not only upon the degree of dilution, but also upon the ability of the apparatus to dissipate heat by radiation, convection, etc.

The cooling effect may be distributed throughout the diaphragm surface by suitable means. For example, where the dialyzer comprises a pile or bundle of cells each provided with a dialytic membrane, individual dialytic cells of the apparatus may be separated by cooling cells through which a suitable cooling liquid may be passed. In this manner the entire area of the diaphragm is exposed to the cooling effect of the cooling liquid. Instead of placing such cooling cells between adjacent diaphragm cells to expose both sides of each diaphragm to the cooling effect, the cooling cells may be placed only between every two diaphragm cells so that each diaphragm is exposed on only one side to the cooling effect thereof. This construction, wherein one cooling cell is provided for each two diaphragm cells, is in most cases adequate to avoid excessive temperatures and has the advantage of furnishing a simplified and more compact apparatus.

We have found that it is by no means essential to subject the entire diaphragm area to the cooling effect. In general the location of maximum temperature is in proximity to a median line on the diaphragm between the liquid inlet and outlet. The location and extent of points of excessive temperature of course depend upon the design of apparatus and consequent flow of liquid. However, where the flow of liquids is vertical through the diaphragm cell, we have found that the provision of a cooling pipe horizontally through the center of the cell and parallel to the plane of the diaphragm greatly reduces the deleterious effects of excessive temperature. By provision of a pair of cooling pipes about midway between the first mentioned pipe and the top and bottom respectively of the diaphragm, substantially complete avoidance of high temperature in the diaphragm cell may be obtained. An apparatus of this type which is particularly suitable for use in conducting the process of the present invention is described and claimed in our copending application Serial No. 76,252, filed on the same date as the present application. Similar results are obtained by similar placement of cooling pipes with respect to flow of liquid along the diaphragm when the flow is horizontal and whether the diaphragm is placed vertically or horizontally. As in the case of the pile arrangement of cooling and dialyzing cells, it is not essential to provide a cooling pipe on both sides of each diaphragm. Thus in a series of liquid compartments separated by diaphragms and arranged alternately for the flow of caustic to be purified and water for the purification, the cooling pipes may be located either in the compartment through which the crude caustic solution flows or that through which the water for the purification flows.

It will be noted that provision of three cooling pipes as above described, divides the dialyzer into four dialyzing sections. It is accordingly possible to obtain similar results by employing a series of four separate dialyzers with intermediate coolers, the flow of liquids being serially through the four dialyzers and countercurrent. If desired, either one or both of the liquids may be passed through the coolers intermediate the dialyzers.

Our invention is not considered to be limited to any particular type of apparatus and comprehends the dialysis of concentrated caustic solutions in countercurrent relation to solvent liquid with intermediate cooling of either or both liquids, whether such cooling is effected in one cell or a series of cells or whether it is effected within the dialyer or in a separate cooler. By "intermediate" cooling is meant a cooling of the liquid after its first dialytic contact and before its last dialytic contact or between the loci of first introduction of the two liquids into dialytic relation.

Our process has been found to be particularly applicable to the preparation of 20% to 30% caustic solution from more concentrated caustic solutions, e. g. the preparation of pure sodium hydroxide or potassium hydroxide solution from impure solutions having a concentration around 50% caustic and containing as impurities such materials as sodium chloride, silica, alumina, and iron oxide ($Fe_2O_3$), presumably present as alkali-metal compounds.

Caustic soda liquor of 48% to 50% NaOH content after the usual purification to reduce the sodium chloride content, may contain per 100 parts $Na_2O$ by weight, around .5 part each of sodium chloride and silica, .03 part alumina, and .001 parts $Fe_2O_3$. By passing such a crude sodium hydroxide solution countercurrent to pure water in the ratio of one part by weight of caustic solution to one part by weight of water, the streams being separated by a cellulose parchment of say 160 grams per square meter weight, a purified sodium hydroxide solution containing 25% to 27% NaOH may be obtained on the water side of the diaphragm and the effluent on the crude caustic side may contain 23% to 25% NaOH. However, substantially all of the sodium chloride, silica, alumina, and iron impurities pass off with the effluent on the crude side of the dialytic membrane with the result that the purified sodium hydroxide solution contains only 3% to 5% of the impurity content of the solution treated ($Na_2O$ basis).

Without cooling in the manner indicated above, the diaphragm life for a process of this type was found to be around 4 to 7 days on a number of test runs. By provision of cooling means providing a cooling of the central portion of the diaphragm as described above so that the diaphragm temperature does not rise above 25° to 40° C., the diaphragm life may be increased to between 30 and over 50 days, the life in general varying inversely with the maximum temperature permitted.

Furthermore, we have found that this control of temperature makes possible a more effective purification and pure products containing 30% less impurities than obtained by the same operations without cooling have been obtained. Thus, in the dialytic purification of a concentrated potassium hydroxide solution containing 1.60 parts potassium chloride per 100 KOH without cooling, a product containing .39 part potassium chloride per 100 KOH was obtained. Temperatures within the dialytic cell as high as 55° to 60° C. were found. The diaphragm life under these conditions was relatively short. By repeating the process with provision of coolers to prevent maximum temperatures above about 25° C. in the dialytic cells the purity of the product was raised to .25 part KCl per 100 KOH. The diaphragm life, moreover, was multiplied about six times.

We claim:

1. In the preparation of an aqueous caustic solution from a concentrated aqueous caustic solution containing at least 25% caustic, involving generally countercurrent flow of dilute caustic solution and said concentrated caustic solution along opposite sides of and in dialytic contact with membranous diaphragm material subject to injury by caustic solution at temperatures of about 110° C., said flow being such that an amount of heat is developed along the diaphragm material which would cause a temperature rise sufficient to be injurious thereto, the improvement which comprises subjecting at least one of the two solutions to cooling between the points of entry of the two solutions into dialytic contact with said membranous diaphragm material, whereby injury to the diaphragm material resulting from such heat is inhibited.

2. In the preparation of an aqueous caustic solution having a concentration of at least 20% caustic from a concentrated aqueous caustic solution containing at least 25% caustic, involving generally countercurrent flow of dilute caustic solution and said concentrated caustic solution along opposite sides of and in dialytic contact with membranous diaphragm material subject to injury by caustic solution at temperatures of about 110° C. so that an amount of heat is developed along the diaphragm material which would cause a temperature rise sufficient to be injurious thereto, the improvement which comprises subjecting at least one of the two solutions to cooling between the points of entry of the two solutions into the compartments where they come into dialytic contact with said membranous diaphragm material, whereby injury to the diaphragm material resulting from such heat is inhibited.

3. In the preparation of an aqueous caustic solution having a concentration of at least 20% caustic from a concentrated aqueous caustic solution containing at least 25% caustic, involving general countercurrent flow of dilute caustic solution and said concentrated caustic solution along opposite sides of and in dialytic contact with parchmentized cellulose dialytic membranes so that an amount of heat is developed along the membranes which would cause a temperature rise sufficient to be injurious thereto, the improvement which comprises subjecting at least one of the two solutions to external cooling by a foreign cooling agent between the points of entry of the two solutions into dialytic contact with said dialytic membranes, whereby injury to the dialytic membranes resulting from such heat is inhibited.

4. In the preparation of an aqueous caustic solution having a concentration of at least 20% caustic from a concentrated aqueous caustic solution containing at least 25% caustic, involving generally countercurrent flow of dilute caustic solution and said concentrated caustic solution along opposite sides of and in dialytic contact with membranous diaphragm material so that an amount of heat is developed along the diaphragm material which would cause a temperature rise sufficient to be injurious thereto, the improvement which comprises subjecting at least one of the two solutions to external cooling by a foreign cooling agent between the points of entry of the two solutions into dialytic contact with said membranous diaphragm material, and regulating the cooling so that the maximum diaphragm temperature is maintained at not above 40° C. whereby injury to the diaphragm material resulting from such heat is inhibited.

5. In the preparation of an aqueous caustic solution having a concentration of at least 20% caustic from a concentrated aqueous caustic solution containing at least 25% caustic involving passage of the latter solution in countercurrent dialytic relation with aqueous liquid, the improvement which comprises passing the more concentrated caustic solution through a series of alternate dialytic zones and cooling zones, and regulating the cooling in said cooling zones so that the maximum temperature in said dialytic zones is maintained at not above 40° C.

6. In the preparation of an aqueous caustic solution having a concentration of at least 20% caustic from a concentrated aqueous caustic solution containing at least 25% caustic, involving generally counter-current flow of dilute caustic solution and said concentrated caustic solution along opposite sides of and in dialytic contact with membranous diaphragm material so that an amount of heat is developed along the diaphragm material which would cause a temperature rise sufficient to be injurious thereto, the improvement which comprises subjecting at least one of the two solutions to external cooling by a foreign cooling agent in the zone between one-fourth and three-fourths the distance between its point of entry into dialytic contact with said membranous diaphragm material and its point of egress from dialytic contact with said membranous diaphragm material, and regulating the cooling so that the maximum diaphragm temperature is maintained at not above 40° C, whereby injury to the diaphragm material resulting from such heat is inhibited.

7. In the preparation of aqueous sodium hydroxide solution having an NaOH concentration between 20% and 30% from aqueous sodium hydroxide solution of around 50% concentration involving passage of the latter solution in countercurrent dialytic relation with aqueous liquid, the improvement which comprises passing the more concentrated NaOH solution through a series of alternate dialytic zones and cooling zones, and regulating the cooling in said cooling zones so that the maximum temperature in said dialytic zones is maintained below about 30° C.

8. In the preparation of aqueous potassium hydroxide solution having a KOH concentration between 20% and 30% from aqueous potassium hydroxide solution of around 50% concentration involving passage of the latter solution in countercurrent dialytic relation with aqueous liquid, the improvement which comprises passing the more concentrated solution through a series of alternate dialytic zones and cooling zones, and regulating the cooling in said cooling zones so that the maximum temperature in said dialytic zones is maintained below about 30° C.

9. In the preparation of aqueous sodium hydroxide solution having an NaOH concentration between 20% and 30% from aqueous sodium hydroxide solution of around 50% concentration involving passage of the latter solution along one side of a parchmentized cellulose dialytic membrane in one direction and an aqueous solution along the other side in the opposite direction, the improvement which comprises subjecting the more concentrated solution to direct contact with a cooling medium during said passage, and regulating the cooling so that the maximum membrane temperature is maintained below about 30° C.

10. In the preparation of aqueous potassium hydroxide solution having a KOH concentration between 20% and 30% from aqueous potassium hydroxide solution of around 50% concentration involving passage of the latter solution along one side of a parchmentized cellulose dialytic membrane in one direction and an aqueous solution along the other side in the opposite direction, the improvement which comprises subjecting the more concentrated solution to direct contact with a cooling medium during said passage, and regulating the cooling so that the maximum membrane temperature is maintained below about 30° C.

ARTHUR W. SADDINGTON.
ARLIE P. JULIEN.

CERTIFICATE OF CORRECTION.

Patent No. 2,138,357. November 29, 1938.

ARTHUR W. SADDINGTON, ET AL.

It is hereby certified that error appears in the printed specification of the above numbered patent requiring correction as follows: Page 3, first column, lines 42 and 61, claims 1 and 2 respectively, after "cooling" insert the words by a foreign cooling agent; line 71, claim 3, for "general" read generally; and second column, lines 4, 22 and 54, claims 3, 4 and 6 respectively, strike out "external"; and that the said Letters Patent should be read with this correction therein that the same may conform to the record of the case in the Patent Office.

Signed and sealed this 24th day of January, A. D. 1939.

Henry Van Arsdale (Seal)                          Acting Commissioner of Patents.